3,110,305
INSPECTION TOOL
Henry A. Sygnator, 22 Southridge, Arlington Heights, Ill.
Filed Apr. 30, 1962, Ser. No. 191,100
9 Claims. (Cl. 128—17)

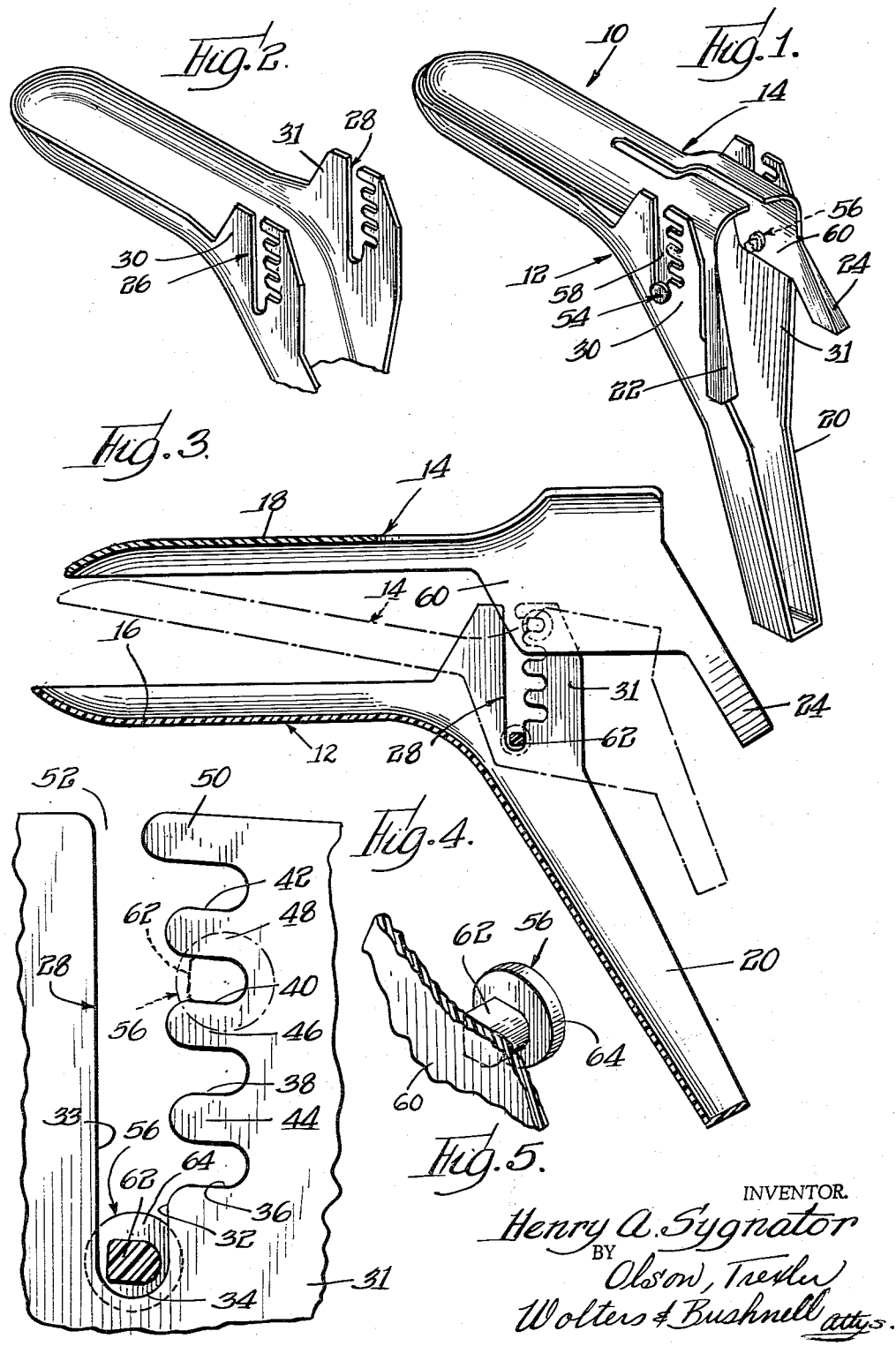

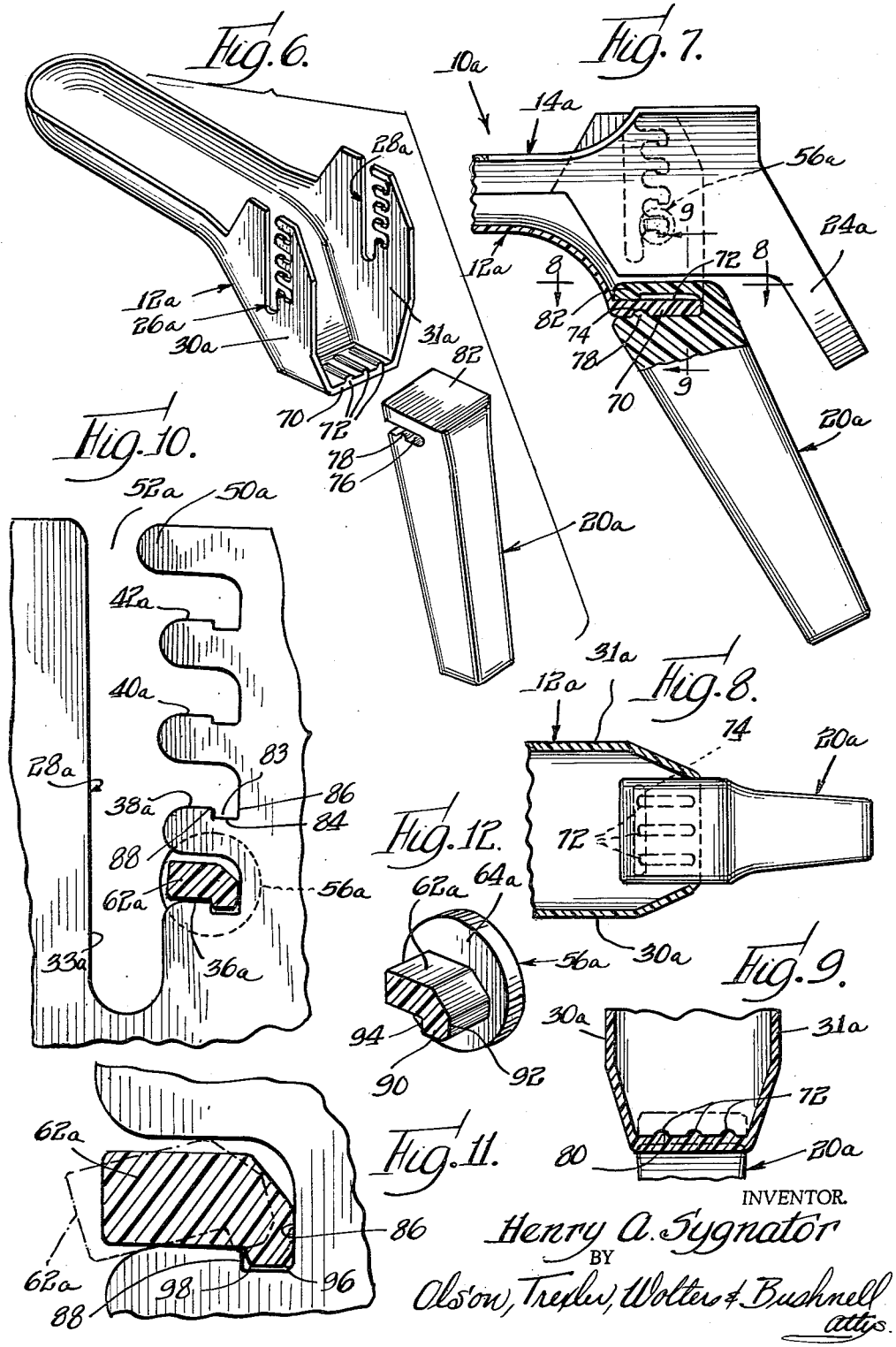

The present invention relates to a novel vaginal inspection tool or speculum.

An important object of the present invention is to provide a novel inspection tool or speculum which is of relatively simplified and economical construction.

A further important object of the present invention is to provide a novel inspection tool or speculum which is sufficiently low in cost so that it may, if desired, be used as a "throw away" item whereby to eliminate the problems raised by the need for sterilizing instruments which are to be reused.

A further object of the present invention is to provide a novel inspection tool which is easy to use and manipulate and which may be readily adjusted.

A more specific object of the present invention is to provide a novel inspection tool or speculum formed from plastic material.

Other objects and advantages of the present invention will become apparent from the following description and the accompanying drawings wherein:

FIG. 1 is a perspective view showing an inspection tool or speculum incorporating features of the present invention.

FIG. 2 is a fragmentary perspective view showing a lower member of the tool shown in FIG. 1.

FIG. 3 is a sectional view showing parts of the tool adjusted to a fully opened or laterally spaced apart position and further showing, in broken lines, the manner in which an upper member of the tool may be pivoted relative to a lower member.

FIG. 4 is an enlarged fragmentary view showing a portion of means for pivotally and adjustably connecting the members of the tool together.

FIG. 5 is a fragmentary perspective view showing a portion of the connecting means in greater detail.

FIG. 6 is an exploded perspective view showing a modified form of the present invention.

FIG. 7 is a fragmentary partial sectional view showing the embodiment of FIG. 6 in assembled condition.

FIG. 8 is a fragmentary sectional view taken along line 8—8 in FIG. 7.

FIG. 9 is a fragmentary sectional view taken along line 9—9 in FIG. 7.

FIG. 10 is an enlarged fragmentary view showing a portion of the structure in greater detail.

FIG. 11 is a further enlarged fragmentary view showing the manner in which the portion of the structure in FIG. 10 may be manipulated; and FIG. 12 is a fragmentary perspective view showing the pivot and locking pin of the modified structure in detail.

Referring now more specifically to the drawing wherein like parts are designated by the same numerals throughout the various figures, an inspection tool or speculum 10 incorporating features of the present invention is shown in FIGS. 1 and 2 and comprises a lower member 12 and an upper member 14. In accordance with the feature of the present invention the lower member 12 is molded in one piece from a suitable plastic material and the upper member is similarly molded in one piece from a suitable plastic material. Thus the device includes only two separate parts whereby assembly and manufacturing costs are minimized. The simplified construction of the tool is such that the cost is quite low and it is contemplated that, if desired, a doctor may use the tool as a disposable or throw away item.

The members 12 and 14 respectively present elongated jaw portions 16 and 18 which are disposed at opposite sides of and generally parallel to a centrally located axis extending longitudinally therebetween when the members are in a fully closed position as shown in FIG. 1. The member 16 also includes a handle portion 20 which is inclined downwardly from one end of the jaw portion 16. The handle portion 20 flares generally diagonally away from the jaw portion 16 so as to avoid interference with a patient during use whereby to facilitate manipulation of the instrument.

The upper member 14 is provided with split handle means including portions 22 and 24 which extend generally diagonally downwardly at approximately the same angle as the handle portion 20. As shown in FIG. 1, the handle portions 22 and 24 extend from integral junctions with opposite sides of one end of the jaw portion 18 so as to avoid obstructing the hollow passageway provided between the jaw portions 16 and 18. The handle portions 22 and 24 are also arranged so that they flare outwardly away from each other and extend over opposite sides of the handle portion 20. This arrangement facilitates gripping of the handle portions 22 and 24 which are substantially smaller and shorter than the handle portion 20 whereby to promote easier adjustment and manipulation of the member 14 in the manner described more in detail below.

The tool is provided with means intermediate the ends of the members 12 and 14 and preferably substantially at adjacent ends of the jaw portions 16 and 18 for connecting the members in a manner which enables the members to be relatively adjusted. More specifically the connecting means is such that the members may be adjusted between the relatively closed position shown in FIG. 1 with the jaw portions 16 and 18 substantially together and the full open or laterally spaced apart position shown in solid lines in FIG. 3 when the jaw portions 16 and 18 are substantially spaced from each other but are still generally parallel to each other. Furthermore, the connecting means is such as to enable the member 14 to be pivoted relative to the member 12 as shown in broken lines in FIG. 3.

The aforementioned connecting means comprises elongated slots 26 and 28 formed in wall sections 30 and 31 at opposite sides of the member 12 and at an end portion of the jaw 16. The elongated slots 26 and 28 extend generally vertically or transversely with respect to the longitudinal axis of the jaw portion 16. The slot means 26 and 28 are essentially identical and, as shown best in FIG. 4, each of the slot means includes a vertically elongated portion defined by opposite edges 32 and 33 and a bottom edge 34 and opening at the upper margin of the wall section. The edge 32 of each of the slot means is relieved to provide a plurality of vertically spaced notches 36, 38, 40 and 42 respectively separated by finger-like elements 44, 46 and 48. It will be observed that the free ends of these finger elements are substantially co-extensive with the edge 32. Another finger-like element 50 is provided for defining the upper edge of the uppermost notch 42, which finger-like element is longer than the previously mentioned finger-like elements so as to cooperate with the upper end of the edge 30 for defining a restricted throat 52 at the upper end of the slot means.

The connecting means further comprises a pair of pin elements 54 and 56 integrally formed with opposite side wall sections 58 and 60 of the member 14 at an end portion of the jaw 18. The wall sections 58 and 60 are spaced apart sufficiently so that they fit closely within the wall sections 30 and 31 of the member 12. The pin elements 54 and 56 respectively project through the slot means 26 and 28.

The pin elements 54 and 56 are essentially identical. As shown best in FIGS. 4 and 5, each of the pin elements includes a shank portion 62 projecting from an integral junction with its associated wall section of the member 14. The length of each shank portion 62 is similar to but slightly greater than the thickness of wall sections 30 and 31 so that the shank portions 62 are adapted to project entirely through the slot means 26 and 28. Each of the pin element shank portions is provided with a generally non-circular and preferably rectangular cross-sectional configuration which may have one margin rounded as shown in FIGS. 4 and 5. The transverse dimensions of each shank portion are less than the distance between the slot edges 32 and 33 so that when the pin elements are located adjacent the lower ends 34 of the slot means or even at any other position between the edges 32 and 33, the members 12 and 14 may be pivoted about the common axis of the pin elements and relative to each other.

The transverse dimensions of the pin element shank portions 62 are preferably slightly greater than the width of the restricted mouth 52 at the upper end of each of the slot means so that the finger elements 50 serve to trap the pin elements within the slot means for preventing accidental disassembly of the members 12 and 14. However, the inherent resiliency of the material from which the tool is formed enables the finger element 50 to flex sufficiently during initial assembly of the members for enabling the pin elements to be snapped beneath the finger elements 50.

It is to be noted that the non-circular cross-sectional configuration of the shank portions 62 of the pin elements is similar to the configuration of the notches 36, 38, 40 and 42. It is contemplated that when the tool is to be adjusted for spreading the jaw portions 16 and 18 apart, the member 14 will be moved upwardly relative to the member 12 so that the pin element shank portions 62 are positioned in alignment with certain of the notches. Then the member 14 may be shifted relative to the member 12 in a direction extending transversely of the slot means for causing the pin elements to enter the desired notches as shown in FIG. 3. FIG. 4 also shows the manner in which the pin elements are adapted to co-operate with the notches and further shows the manner in which the pin elements may be selectively and alternatively located at different positions in order to effect the desired adjustment between the members 12 and 14. In the embodiment shown, each of the notches is defined by substantially parallel opposite side edges which are adapted to engage the generally straight opposite side edges of the pin shanks so that when the pin shanks are located in desired notches, the pins will be locked against rotation relative to the member 12 and this, of course, prevents relative rotation between the members 12 and 14. It is further to be noted that the notches are inclined downwardly away from their respective open ends for resisting any tendency of the pins to slip forwardly and out of notches into which they have been positioned.

Each of the pin elements 54 and 56 also includes an enlarged head portion 64 at the outer end of its respective shank 62. The head portions of the pin elements are adapted to overlie the outer surfaces of the wall sections 30 and 31. These head portions not only resist any tendency for the wall sections 30 and 31 to spread apart, but also serve as bearings or guides engageable with outer surfaces of the wall sections 30 and 31 for maintaining the members 12 and 14 in proper alignment with respect to each other.

In FIGS. 6 through 12 there is shown a modified form of the present invention which is similar to the above described structure as indicated by the application of identical reference numerals with the suffix a added to corresponding elements. One important difference in this embodiment is that the handle 20a is formed separately from and is detachably connected with the member 12a. This construction minimizes the bulkiness of the entire unit and thus reduces the amount of space required for storing or packaging. It is contemplated that the handle element 20a may be provided as permanent or a reusable element while the members 12a and 14a may be provided as throw away items if desired. This would still further minimize packaging and storing problems.

In order to provide means for releasably connecting the handle element with the member 12a, a generally horizontally disposed wall section 70 is formed integrally between lower margins of the side walls 30a and 31a. Parallel ribs 72 are spaced across the upper surface of the wall 70 and extend generally longitudinally of the member 12a while a transversely disposed groove 74 (see FIGS. 7 and 8) is formed in the under surface of the wall 70.

The handle member 20a is formed with a slot 76 adjacent an upper end thereof for receiving the wall section 70. A rib 78 extends transversely across a lower surface of a slot 76 for co-operative engagement with the groove 74 and thereby releasably locking the handle member with the member 12a. In addition parallel grooves 80 are formed in the upper surface of the slot 76 for co-operative engagement with the ribs 72 which prevents the handle member from twisting relative to the member 12a. It is to be noted that the upper end section 82 of the handle member which defines the upper side of the slot 76 is relatively thin. Furthermore the handle member is formed from plastic or other suitable material which is sufficiently resilient to enable the upper end section 82 to flex for permitting engagement and disengagement of the ribs and grooves during assembly of the handle with or removal of the handle from the member 12a.

In this embodiment the pivot and locking pin shanks 62a and the collapsible slots 36a—42a are also of modified construction. More specifically as shown in FIGS. 10 and 11, each of the slots 36a—42a is provided with a transverse notch 83 at its inner end defined by a bottom surface 84 a substantially straight abutment or locking surface 86 at the inner end of its notch and another side surface 88 generally parallel to the surface 86 and spaced therefrom a predetermined distance. As shown in FIGS. 10-12, the pivot and locking pin shank 62a is modified so that it includes a laterally projecting lug 90 having a thickness between generally flat and parallel side surfaces 92 and 94 similar to the distance between the notch surfaces 86 and 88 and a lateral extent similar to the depth of the aforementioned notches. Thus the lug 90 is adapted to fit within a notch 83 as shown in FIGS. 10 and 11 and engage the abutment and locking surfaces 86 and 88 for restraining the pin shank 62a against pivotal movement about its own axis and thereby locking the member 14a in the desired position. It is to be noted that the overall height of each of the slots 36a—42a is greater than the overall height of the pin shank 62a. In addition free corners of the lug 90 are relieved or beveled as at 96 and 98. With this structure the member 14a may be manually raised or shifted parallel to the longitudinal axis of the vertical slot 28a whereupon the member 14a may be pivoted about the axis of the pin shank 62a as shown in broken lines in FIG. 11 for disengaging the lug 90 from the notch 83 and thereby releasing the pin 56a for thereafter permitting any desired adjustment of the member 14a.

While the preferred embodiment of the present invention has been shown and described herein, it is obvious that many structural details may be changed without departing from the spirit and scope of the appended claims.

The invention is claimed as follows:

1. A tool of the type described comprising a first one-piece member including a jaw portion, and a second one-piece member including a second jaw portion extending generally along said first jaw portion, said members including cooperable integral means connecting said members adjacent ends of said jaw portions for selective pivotal and lateral adjustment relative to each other and for releasably retaining said members in a desired adjusted position, said co-operable means connecting said members comprising a slot means in one of said members having first and second portions, and pin means on the other said members and extending into said slot means and selectively shiftable between said first and second portions of said slot means, said pin means being rotatable in said first slot means portion, and said pin means and said second slot means portion including co-operable interengageable surfaces for preventing rotation of the pin means when the pin means is disposed in said second slot means portion.

2. A tool, as defined in claim 1, wherein said first member includes a handle portion extending generally diagonally downwardly from said first mentioned jaw portion.

3. A tool, as defined in claim 2, wherein said second member includes a pair of spaced apart handle portions extending generally diagonally downwardly from said second mentioned jaw portion.

4. A tool, as defined in claim 3, wherein said spaced apart handle portions of said second member project outwardly of opposite sides of said handle portion of the first member.

5. A tool of the type described comprising a first plastic member including a jaw portion and upstanding spaced apart wall sections adjacent one end of and at opposite sides of said jaw portion, a second plastic member including a jaw portion extending along said first mentioned jaw portion and spaced apart wall sections adjacent one end of and at opposite sides of said second mentioned jaw portion and respectively extending along said first mentioned wall sections, said wall sections of one of said members having slot means therein including portions elongated in a direction extending transversely of said jaw portions, the slot means in at least one of said last mentioned wall sections including a plurality of additional slot means portions extending transversely of said direction of said first mentioned slot means portions, and pin elements extending in said slot means and joined to said wall sections of the other said members for pivotally and laterally adjustably connecting said members, at least one of said pin elements being selectively shiftable into and out of said additional slot means portions for releasably locking said members in a desired adjusted position.

6. A tool of the type described comprising a first plastic member including a jaw portion and upstanding spaced apart wall sections adjacent one end of and at opposite sides of said jaw portion, a second plastic member including a jaw portion extending along said first mentioned jaw portion and spaced apart wall sections adjacent one end of and at opposite sides of said second mentioned jaw portion and respectively extending along said first mentioned wall sections, said wall sections of one of said members having elongated slot means therein extending transversely of said jaw portions, and pin element extending in said slot means and joined to said wall sections of the other of said members for pivotally and laterally adjustably connecting said members, each of said slot means including a first elongated portion of predetermined width extending transversely of said jaw portions, and laterally projecting notch means in an edge of said elongated portion, said pin means having transverse dimensions less than said predetermined width for enabling the pin means to pivot within said first portion of the slot means, and said pin means and said notch means having inter-engageable surfaces when the pin means is positioned in the notch means for securing the pin means against pivotal movement.

7. A tool, as defined in claim 6, wherein said first portion of said slot means includes a restricted throat through which said pin means may be snapped for permitting assembly of the members, said throat having a width less than transverse dimensions of said pin means for retaining the pin means against unauthorized disassembly from the slot means.

8. A tool of the type described comprising a first member including a jaw portion and upstanding spaced apart wall sections at opposite sides of said jaw portion, a second member including a jaw portion extending along said first mentioned jaw portion and spaced apart opposite side wall sections respectively extending along said first mentioned wall sections, said wall sections of one of said members including slot means having first portions elongated in a direction extending transversely of said jaw portions, at least one of said slot means having a plurality of second portions extending generally transversely of said direction, and pin means on the wall sections of the other of said members extending into said slot means for connecting said members for lateral adjustment relative to each other, at least a portion of said pin means and said second slot means portions including selectively inter-engageable surfaces retaining said members in a desired adjusted relationship until said members are manually manipulated relative to each other for relatively shifting said pin means portion and said second slot means portions first in one direction extending substantially in said first mentioned direction for disengaging said surfaces and then in a second direction transversely of said first mentioned direction.

9. A tool, as defined in claim 8, wherein each of said second slot means portions intersect and extend laterally from a first slot means portion which extends transversely of said jaw members at spaced locations selectively for receiving said portion of said pin means, and recess means in lower edges of said second laterally extending slot means portions for engaging and releasably retaining the pin means portion.

References Cited in the file of this patent
UNITED STATES PATENTS

| | | |
|---|---|---|
| 997,823 | Humphreys | July 11, 1911 |
| 2,300,040 | Betts | Oct. 27, 1942 |
| 2,672,859 | Jones | Mar. 23, 1954 |
| 3,040,738 | Moore | June 26, 1962 |